United States Patent [19]

Bealkowski et al.

[11] Patent Number: 5,852,738

[45] Date of Patent: Dec. 22, 1998

[54] METHOD AND APPARATUS FOR DYNAMICALLY CONTROLLING ADDRESS SPACE ALLOCATION

[75] Inventors: Richard Bealkowski; Doyle Stanfill Cronk; Benjamin Russell Grimes; Michael Robert Turner, all of Austin, Tex.

[73] Assignee: International Business Machines Corporation, Armonk, N.Y.

[21] Appl. No.: 752,410

[22] Filed: Nov. 19, 1996

Related U.S. Application Data

[63] Continuation of Ser. No. 266,914, Jun. 27, 1994, abandoned.

[51] Int. Cl.$^6$ ..................................................... G06F 12/10
[52] U.S. Cl. .................... 395/800.01; 395/412; 395/413; 395/415; 395/416; 395/417; 395/418; 395/419; 395/410
[58] Field of Search ............................... 395/800.01, 410, 395/412, 413, 415, 416, 417, 418, 419

[56] References Cited

U.S. PATENT DOCUMENTS

| 5,319,760 | 6/1994 | Mason et al. | 395/400 |
| 5,581,722 | 12/1996 | Welland | 395/417 |
| 5,652,854 | 7/1997 | Wong | 395/416 |

OTHER PUBLICATIONS

IBM TDB, "Profiling Technique for Memory References Within Individual Pages on Paging–Based Virtual Memory Systems", vol. 35, No. 3, Aug. 1992, pp. 320–325.
IBM TDB "Address–Translation Patching Mechanism", vol. 36, No. 08, Aug. 1993, pp. 15–18.
Clements, Microprocessor Systems Design, PWS–KENT Publishing Company, 1992, pp. 466–532.
Peterson et al., Operating System Concepts, Addison Wesley Publishing Company, 1985, pp. 201–255.
PowerPc TM 603 User's Manual, Motorola Inc., 1994, pp. 7–1 to 7–85.
IEEE Micro., vol. 13, No. 3, Jun. 1993, Ye York US pp. 22–35, Performance Features of The PA7100 Microprocessor.
Computer Society International Conference (COMPCON)., vol. 36, 1 Mar. 1991, IEEE, Washington. D.C., Architecture and Compielr Enhancements For PA–RISC Workstations.. p. 215.

*Primary Examiner*—Alyssa H. Bowler
*Assistant Examiner*—Dzung C. Nguyen
*Attorney, Agent, or Firm*—Volel Emile; Paul S. Drake

[57] ABSTRACT

A method for managing a memory address space in a memory system, the memory system having multiple block address translation entries, each entry defining a portion of the memory address space, including the steps of determining that a received virtual address references a portion of the memory address space not defined by any of the block address translation entries, reallocating at least one of the block address translation entries to define a portion of the memory address space including the received virtual address, and providing a physical address matching the virtual address by using the reallocated block address translation entries. In addition, an apparatus for managing a memory address space in a memory system, the memory system having multiple block address translation entries, each entry defining a portion of the memory address space, including apparatus for determining that a received virtual address references a portion of the memory address space not defined by any of the block address translation entries, apparatus for reallocating at least one of the block address translation entries to define a portion of the memory address space including the received virtual address, and apparatus for providing a physical address matching the virtual address by using the reallocated block address translation entries.

15 Claims, 7 Drawing Sheets

| | | | |
|---|---|---|---|
| | | | PHYSICAL ADDRESS 0 |
| SEGMENT 0 | 402 | 00000000 | |
| SEGMENT 1 | 404 | 10000000 | |
| SEGMENT 2 | 406 | 20000000 | |
| SEGMENT 3 | 408 | 30000000 | |
| SEGMENT 4 | 410 | 40000000 | |
| SEGMENT 5 | 412 | 50000000 | |
| SEGMENT 6 | 414 | 60000000 | |
| SEGMENT 7 | 416 | 70000000 | |
| SEGMENT 8 | 418 | 80000000 | |
| SEGMENT 9 | 420 | 90000000 | |
| SEGMENT A | 422 | A0000000 | |
| SEGMENT B | 424 | B0000000 | |
| SEGMENT C | 426 | C0000000 | |
| SEGMENT D | 428 | D0000000 | |
| SEGMENT E | 430 | E0000000 | |
| SEGMENT F | 432 | F0000000 | |
| | | | PHYSICAL ADDRESS 4 GIG |

METHOD AND APPARATUS FOR DYNAMICALLY CONTROLLING ADDRESS SPACE ALLOCATION

This application is a continuation of application Ser. No. 08/266,914, filed on Jun. 27, 1994 now abandoned.

TECHNICAL FIELD

This invention relates generally to personal computer systems and, more particularly, to a method for dynamically managing addressing controls.

BACKGROUND OF THE INVENTION

Computer systems typically utilize two main address spaces for specifying the location of data or locations in memory. A physical address space uses physical addresses to specify the actual location of data in memory. A virtual address space uses virtual addresses to specify the location of data or instructions in a memory construct. That is, software is typically able to set up a logical location of data in a memory construct so that the software does not need to know or understand the actual physical memory locations and limitations. A memory management unit is used by a microprocessor to translate virtual memory addresses to physical memory addresses, thereby further insulating the software from the physical memory locations and limitations. In some cases, physical memory addresses may also be further translated by another device, such as a graphics adapter, to local physical memory addresses.

One limitation of physical memory may be the size of that memory. That is, the virtual address space may be larger than the physical address space. This limitation is easily handled by most systems because the microprocessor only works with a small portion of memory at any given time. One technique is to page data in and out of memory while using translation lookaside buffers, segment registers and page tables to keep track of the data. This paging technique is typically used to handle small pages (such as 4 kilobytes) of data at a time. Another technique is to use a few block address translation registers to handle large blocks of data at a time.

However, when a virtual to physical address translation occurs, it is possible that there are no allocated physical addresses for a given virtual address. This is commonly referred to in the prior art as an exception, page exception or a page fault. Typically, a software exception handler is notified of the exception and it is up to the exception handler to determine what action to take to resolve the exception. These actions can include allocating a cleared page of physical memory and marking it valid so that the requested address is now valid, using a different address, or cancelling the application program requesting the address that caused the exception.

DISCLOSURE OF THE INVENTION

The present invention includes a method for managing a memory address space in a memory system, the memory system having multiple block address translation entries, each entry defining a portion of the memory address space, including the steps of determining that a received virtual address references a portion of the memory address space not defined by any of the block address translation entries, reallocating at least one of the block address translation entries to define a portion of the memory address space including the received virtual address, and providing a physical address matching the virtual address by using the reallocated block address translation entries. In addition, the present invention includes an apparatus for managing a memory address space in a memory system, the memory system having multiple block address translation entries, each entry defining a portion of the memory address space, including apparatus for determining that a received virtual address references a portion of the memory address space not defined by any of the block address translation entries, apparatus for reallocating at least one of the block address translation entries to define a portion of the memory address space including the received virtual address, and apparatus for providing a physical address matching the virtual address by using the reallocated block address translation entries.

A further understanding of the nature and advantages of the present invention may be realized by reference to the remaining portions of the specification and the drawings.

BRIEF DESCRIPTION OF THE DRAWINGS

FIG. 4 is a block diagram of a segmented view of the system address space;

BEST MODE FOR CARRYING OUT THE INVENTION

This disclosure describes a computer system where virtual addressing and paging are enabled. Block address translation registers are also used to define a proportionally small subset of physical addresses. Page faults are used to invoke an exception handler. The exception handler dynamically alters the defined state of at least one of the block address translation registers in response to a page fault, thus providing for virtual to physical addressability. This allows for quick access to large portions of memory on a dynamic basis.

In the preferred embodiment, all pages are defined as invalid, thereby generating page faults whenever a requested virtual address is not defined by a block address translation register. In addition, some portions of memory are defined as having different access characteristics, such as cached or uncached. Furthermore, in the preferred embodiment, the address space is sparsely populated, thereby requiring a nimble system to dynamically handle page faults.

Figure 1A:
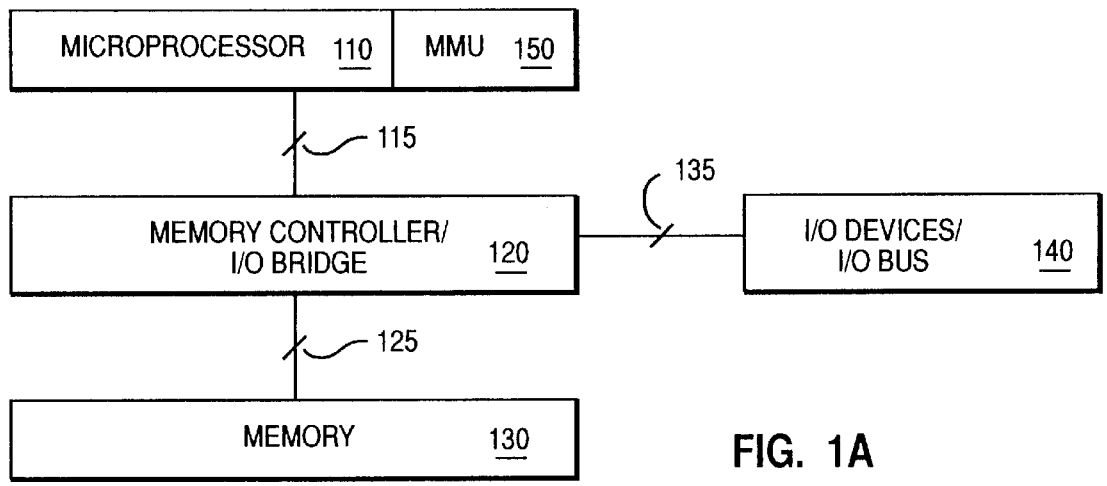
FIG. 1A is a block diagram of a typical digital computer utilized by a preferred embodiment of the invention.

Referring now to the figures, and in particular to FIG. 1A, there is shown a block diagram of a typical digital computer 100 utilized by a preferred embodiment of the invention. The computer includes a microprocessor 110. The microprocessor 110 is preferably a microprocessor in the PowerPC (trademark of International Business Machines Corp.) family of microprocessors. The PowerPC is more fully described in "PowerPC 601 RISC Microprocessor User's Manual" and "PowerPC 603 Microprocessor User's Manual" and are well known in the art. Microprocessor 110 may include a single processor or multiple processors. Microprocessor 110 is coupled to a memory controller—I/O bridge 120 via bus 115 to allow the microprocessor to communicate with various elements described below. MMU (memory management unit) 150 is utilized to handle translating virtual addresses to physical addresses and is described in greater detail below with reference to FIG. 1B. Memory controller—I/O bridge 120 is further coupled to system memory 130 via bus 125. System memory 130 typically includes RAM (random access memory). Memory controller I/O bridge is also coupled to I/O devices—I/O bus 140 via bus 135. I/O devices—I/0 bus allow various I/O units to communicate with the microprocessor. I/O devices 140 may include a keyboard, mouse, tablet or other types of input devices, or a text monitor, plotter or other types of output devices, or disk drive memory, magnetic memory, or other types of I/O devices. Bus 115, bus 125, and bus 135 contain address, data, and control lines commonly known by those skilled in the art.

Figure 1B:
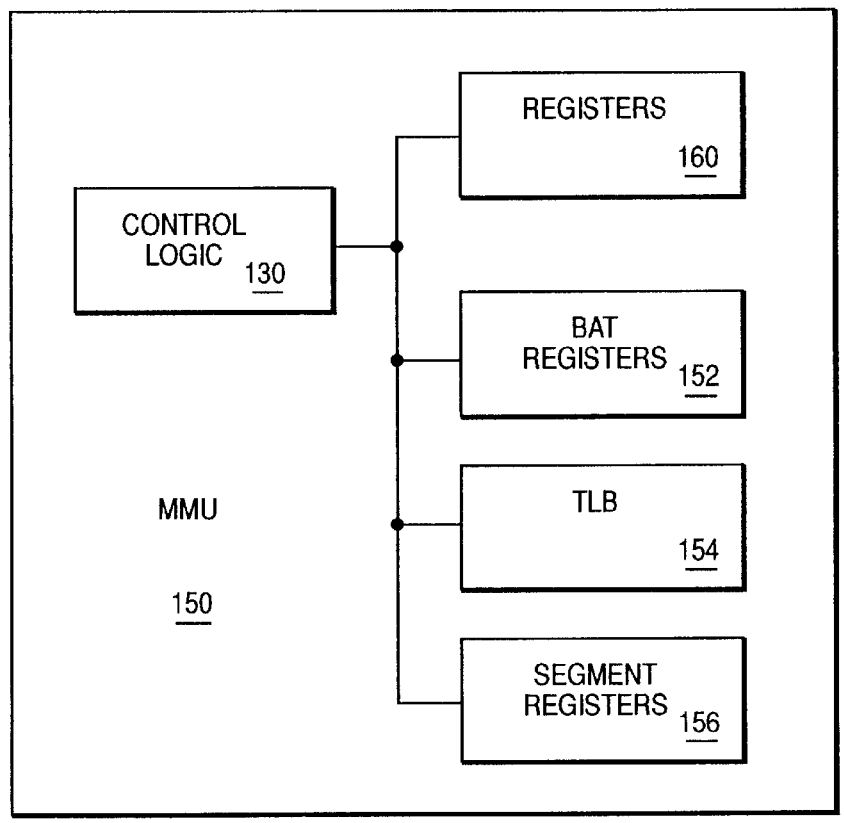
FIG. 1B is a block diagram of a typical memory management unit, shown in FIG. 1A above, utilized by a preferred embodiment of the invention.

FIG. 1B is a block diagram of a MMU (memory management unit) 150, shown in FIG. 1A above, utilized by a preferred embodiment of the invention. The MMU includes control logic 180. BAT (block address translation) registers 152, TLBs (translation lookaside buffers) 154, segment registers 156, and other registers 160. BATs, TLBs and associated page tables located in system memory, and segment registers are well known in the art and their function is not described in detail herein except with regards to the function of the present invention.

Figure 2:
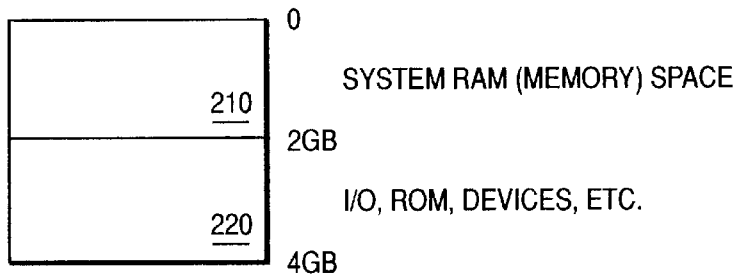
FIG. 2 is a block diagram of a memory map.

Referring to FIG. 2, there is shown a simplified view of a system address space memory map 200. In the preferred embodiment, the system address space memory map 200 is comprised of a total real address space of 4 gigabytes (GB), not all of which is required to be populated with actual memory such as physical RAM 130 and I/O devices 140. The system address space memory map 200 is further defined by two 2 GB spaces, system RAM 210 and I/O space 220. In the preferred embodiment, system RAM 210 is defined as cached and I/O space 220 is defined as not cached. The division of system address space memory map 200 into two spaces with differing access characteristics is arbitrary and other divisions of system address space memory map 200 are possible.

Figure 3:
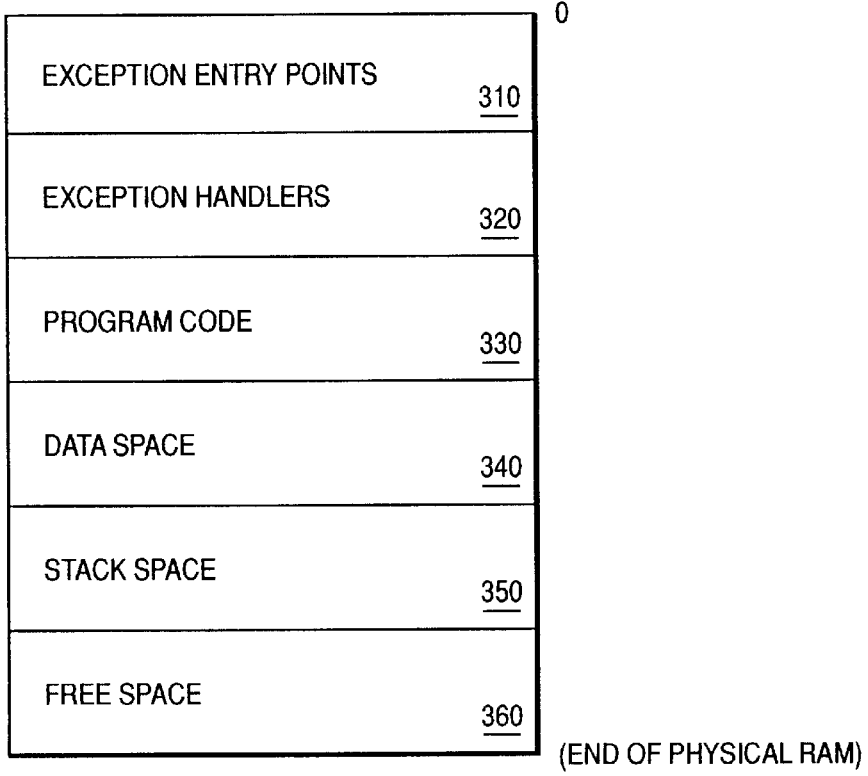
FIG. 3 is a block diagram of a typical set of contents in system memory.

Referring to FIG. 3, there is shown a typical set of contents in memory 130. Memory 130 typically contains exception entry points 310, exception handlers 320, program code 330, data space 340, stack space 350, and free space 360. Of course, variations in contents and usage of memory 130 are possible.

Referring now to FIG. 4, there is shown a segmented view 400 of the system address space memory map 200, according to a preferred embodiment of the invention. The real address space is divided into sixteen 256 MB (megabyte) segments. These 256 MB segments are segments 0 through segment F (402 through 432). As described in FIG. 2, in the preferred embodiment, segments 0 through 7 are defined as cached and segments 8 through F are defined as not cached. As described above, not all of system memory is required to be populated with actual memory.

The process of incurring page faults and exception handling will now be described with reference to two different types of microprocessors.

Figure 5:
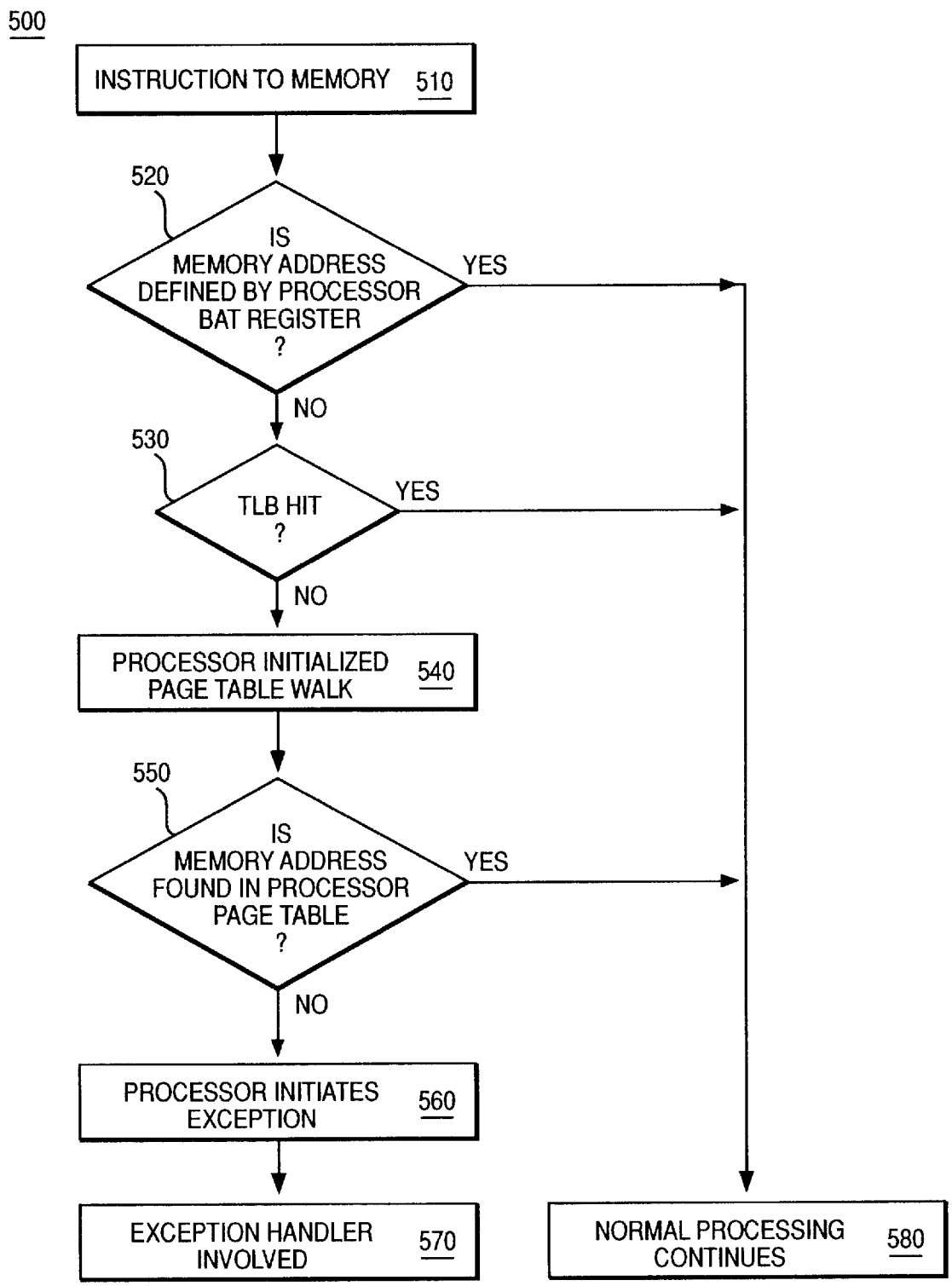
FIG. 5 is a flow diagram illustrating address resolution in a first type of microprocessor.

Referring now to FIG. 5, there is shown a flow diagram of a microprocessor (of a first type) address resolution method 500. Preferably this address resolution method 500 is that of a PowerPC 601 microprocessor, compatible microprocessor, or follow-on microprocessor. The PowerPC address resolution means is completely described in "PowerPC 601 RISC Microprocessor User's Manual" and is well known in the art. First, an instruction attempts an access 510 to some part of the system address space 200 (alternate view 400). The first-type microprocessor checks if the access is available by checking BAT (block address translation) register 520 for a real address for the requested virtual address. If the access of step 520 is available (a hit), then control continues at step 580, normal processing continues with the requested memory now being accessed by the microprocessor. If the check of step 520 determined that access is not available (a miss), then flow continues to step 530 where the TLB (translation lookaside buffer) is checked for a real address for the requested virtual address. If the TLB is a hit in step 530, then the flow proceeds to step 580. If the TLB is a miss in step 530 then control proceeds to step 540 where the microprocessor walks the page tables looking for the requested virtual address. If there is a hit in the page table check in step 550 then control proceeds to step 580. If there is a miss (no page table entry contains the requested virtual address) as determined by step 550 then the flow proceeds to step 560 where an exception is initiated. Following the initiation of an exception by step 560 an exception handler routine is invoked in step 570. In the preferred embodiment, there are no valid TLB or page table entries. Therefore, step 530 and step 550 will never result in the yes path being taken in the preferred embodiment.

Figure 6:
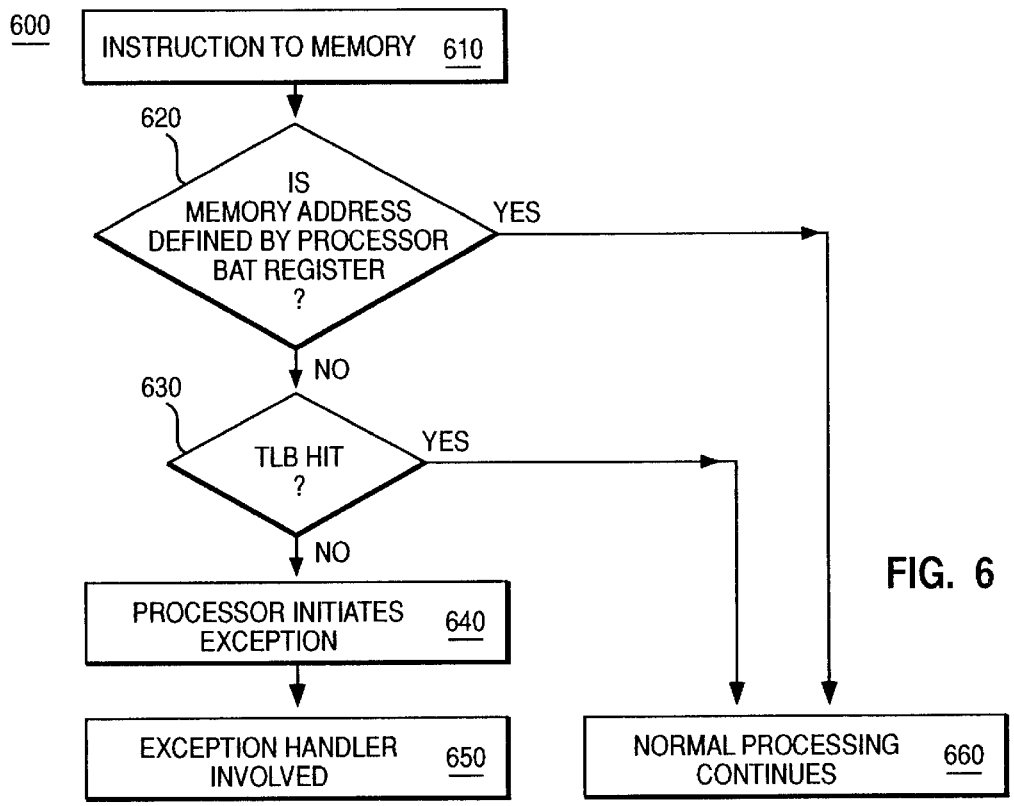
FIG. 6 is a flow diagram illustrating address resolution in a second type of microprocessor.

Referring now to FIG. 6, there is shown a flow diagram of a microprocessor (of a second type) address resolution method 600. Preferably this address resolution method 600 is that of a PowerPC 603 microprocessor, compatible microprocessor, or follow-on microprocessor. The PowerPC address resolution means is completely described in "PowerPC 603 RISC Microprocessor User's Manual" and is well known in the art. First, an instruction attempts an access 610 to some part of the system address space 200 (alternate view 400). The second-type microprocessor checks if the access is available by checking BAT registers 620. If the access of step 620 is available then control continues at step 660, normal processing continues. If the access of check of step 620 determined that access is not available, then the flow continues to step 630 where the TLB is checked. If the TLB is a hit in step 630, then the flow proceeds to step 660. If there is a TLB miss in step 630 then control proceeds to step 640 where an exception is initiated. Following the initiation of an exception by step 640 an exception handler is invoked in step 650. In the preferred embodiment, there are no valid TLB entries. Therefore, step 630 will never result in the yes path being taken in the preferred embodiment.

Figure 7:
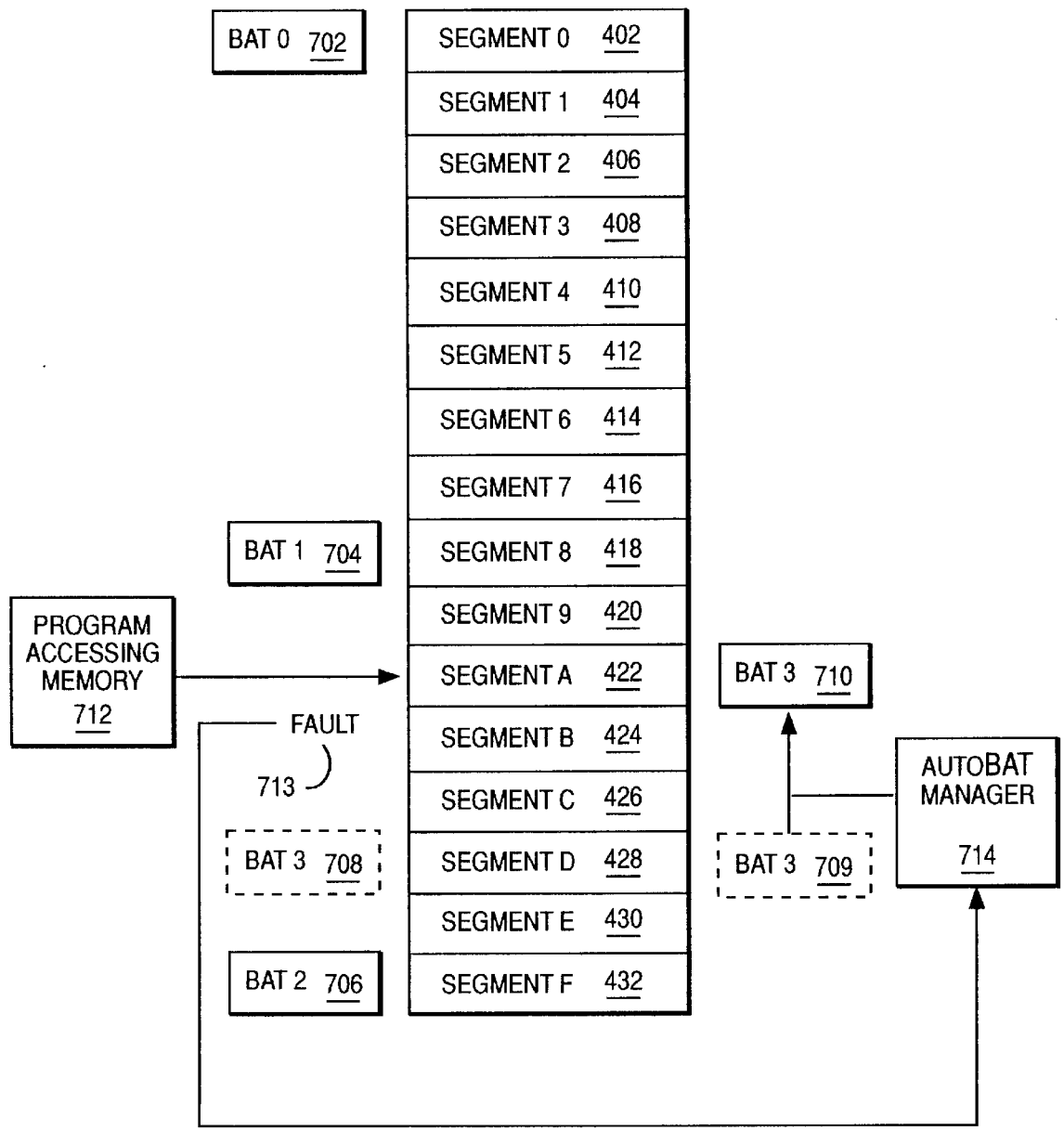
FIG. 7 is a block diagram illustrating a conceptual overview of the present invention.

Referring now to FIG. 7, there is shown a conceptual view 700 of the present invention. The address space 400 of FIG. 4 is shown again. Conceptual view 700 shows a set of BAT settings 702, 704, 706, and 708 on the left side of the diagram representing the state at the time of an exception or page fault occurrence 716. A program accessing part of the address space 712 generates a fault 713 because segment A 422 is not defined by one of the BATs 702–708. Fault 713 initiates an exception causing the exception handler manager 714 (hereinafter referred to as AUTOBAT) to be invoked. This is fault resolution 718 on the right side of the diagram. AUTOBAT manager 714 then reprograms BAT 3 708 also shown as BAT 3 709 from segment D 428 to segment A 422 resulting in BAT 3 710. The AUTOBAT manager also checks whether the address space being accessed is cached or not cached and marks the BAT register for those memory characteristics. When AUTOBAT manager 714 completes this process, the program accessing memory 712 is resumed and execution proceeds because there is now a BAT register with a matching virtual address. The process flow of conceptual view 700 is described in greater detail below in FIGS. 8–11.

Figure 8:
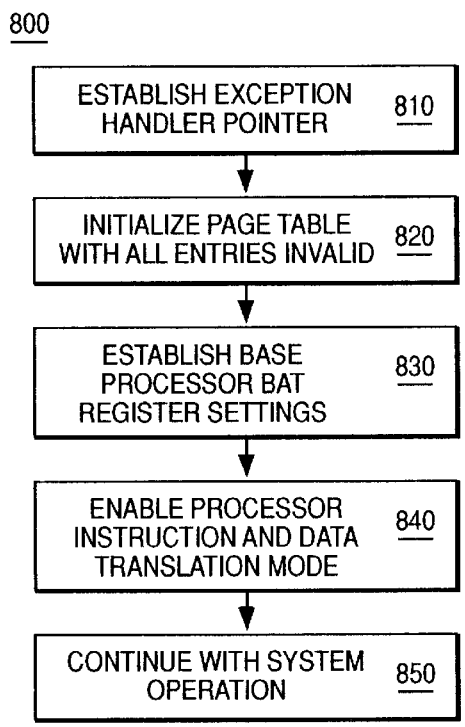
FIG. 8 is a flow diagram of a setup and initialization sequence.

Referring now to FIG. 8, there is shown a flow diagram of a setup and initialization sequence 800 of a preferred embodiment of the invention. Program code, such as a power on initialization routine which may be found in program code 330, establishes the exception handler pointer in exception entry points 310, step 810. The pointer will point to an exception handler 320 and more specifically AUTOBAT manager 714. The power on code then initializes a page table area in data space 340 in step 820. In the preferred embodiment, the page table is initialized with all entries invalid. This guarantees that any address not defined by a BAT will invoke the exception handler. Alternative embodiments may use valid page entries. The BAT registers are then loaded with initial values 830. A translation mode (the translation mode is a known mode which enables virtual addressing in PowerPC microprocessors) of the microprocessor is then enabled in step 840. At this point this phase of initialization is complete and processing continues, step 850.

Figure 9:
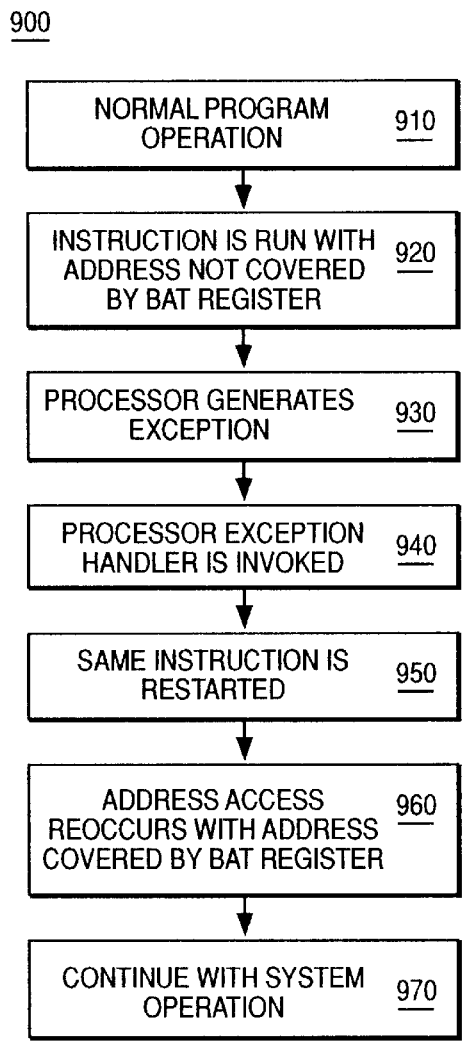
FIG. 9 is a flow diagram of an instance of an exception occurrence.

Referring now to FIG. 9, there is shown a flow diagram of the exception event 900. A program is executing, step 910. The program executes a memory access instruction which is not defined by a BAT register 920. The microprocessor generates an exception 930 because of the failed access of step 920. The exception handler is then invoked in step 940. The operation of the exception handler is more fully described in FIGS. 10 and 11. The excepting instruction of step 920 is then restarted, step 950. The instruction then executes with proper BAT definition, step 960. The program then continues on with normal execution in step 970.

Figure 10:
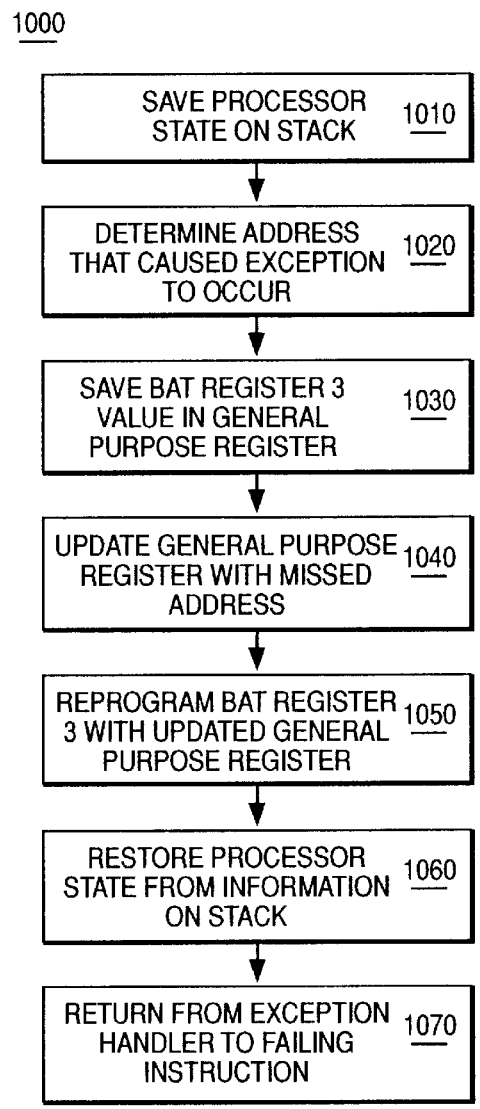
FIG. 10 is a flow diagram of the exception handling of the present invention on a first type of microprocessor.

Referring now to FIG. 10, there is shown the exception handler for a first type of microprocessor 1000. The exception handler is, more specifically, AUTOBAT manager 714. Once the exception handler is invoked, the handler 1000 saves the required state on the stack 1010. The address which resulted in the exception is then determined, step 1020, which is through reading a microprocessor register. The contents of BAT 3 are copied into general purpose registers, step 1030. The BAT 3 values now in general purpose registers are modified to provide addressability to the address space which caused the exception, step 1040. BAT 3 is then loaded with the updated values, step 1050. The previously stored state from step 1010 is restored, step 1060. The exception handler then exits, step 1070, returning to the excepted instruction.

Figure 11:
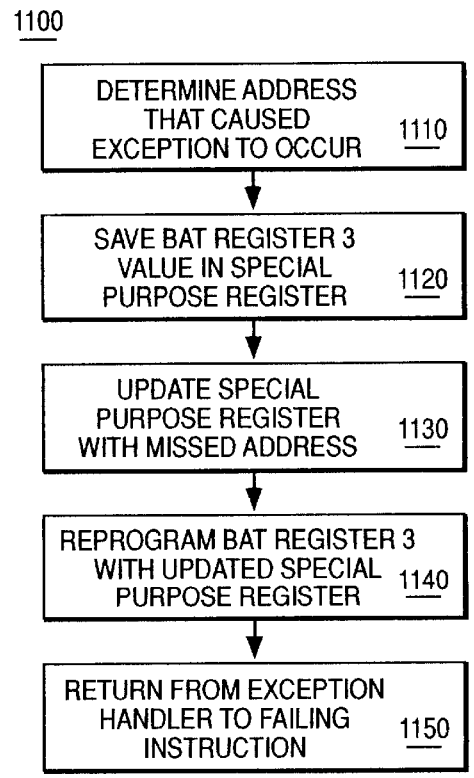
FIG. 11 is a flow diagram of the exception handling of the present invention on a second type of microprocessor.

Referring now to FIG. 11, there is shown the exception handler for a second type of microprocessor 1100. The exception handler is, more specifically, AUTOBAT manager 714. Once the exception handler is invoked, the address which resulted in the exception is then determined, step 1110, which is through reading a microprocessor register. The contents of BAT 3 are copied into special purpose registers, step 1120. The BAT 3 values now in special purpose registers are modified to provide addressability to the address space which caused the exception, step 1130. BAT 3 is then loaded with the updated values, step 1140. The exception handler then exits, step 1150, returning to the excepted instruction.

The use of dynamic BAT allocation as described above provides for a compact and nimble memory management system. The system is compact because of minimum page table usage and because managing the BAT registers is an operation requiring few instructions. The system is nimble because the exception handler is invoked only when an exception occurs and exceptions are normally uncommon due to the concept of locality of reference. That is, most memory accesses are typically contiguous or close to previous memory accesses already defined by a BAT, thereby typically not causing exceptions due to the breadth of memory defined by a BAT.

Although the present invention has been fully described above with reference to specific embodiments, other alternative embodiments will be apparent to those of ordinary skill in the art. For example, while the preferred embodiment uses PowerPC microprocessors, this invention can be implemented on other microprocessors. Likewise, those skilled in the art will recognize that many elements of the invention can be implemented in hardware or software. Therefore, the above description should not be taken as limiting the scope of the present invention which is defined by the appended claims.

What is claimed is:

1. A method for managing a memory address space in a memory system, said memory system having a plurality of block address translation entries, each entry defining a portion of the memory address space, comprising the steps of:

a) determining that a received virtual address references a portion of the memory address space not defined by any of the block address translation entries;

b) reallocating at least one of said block address translation entries to define a part of the memory address space that includes the portion of the memory space referenced by said received virtual address; and c) providing a physical address matching the virtual address by using the reallocated block address translation entries.

2. The method of claim 1 wherein said step of determining includes determining that the received virtual address references a portion of the memory address space not defined by any translation lookaside buffer entries.

3. The method of claim 2 wherein said step of determining includes determining that the received virtual address references a portion of the memory address space not defined by any page table entries.

4. The method of claim 3 further comprising the step of initially defining all the translation lookaside buffer entries and page table entries as invalid.

5. The method of claim 4 wherein said step of reallocating includes allocating access characteristics to said block address translation entries of said defined portion of the memory address space.

6. An apparatus for managing a memory address space in a memory system, said memory system having a plurality of block address translation entries, each entry defining a portion of the memory address space, comprising:

a) means for determining that a received virtual address references a portion of the memory address space not defined by any of the block address translation entries;

b) means for reallocating at least one of said block address translation entries to define a part of the memory address space that includes the portion of the memory space referenced by said received virtual address; and c) means for providing a physical address matching the virtual address by using the reallocated block address translation entries.

7. The apparatus of claim 6 wherein said means for determining includes determining that the received virtual address references a portion of the memory address space not defined by any translation lookaside buffer entries.

8. The apparatus of claim 7 wherein said means for determining includes determining that the received virtual address references a portion of the memory address space not defined by any page table entries.

9. The apparatus of claim 8 further comprising means for initially defining all the translation lookaside buffer entries and page table entries as invalid.

10. The apparatus of claim 9 wherein said means for reallocating includes allocating access characteristics to said block address translation entries of said defined portion of the memory address space.

11. A computer system comprising:

a) a microprocessor for processing data; and b) memory for storing data to be processed by said microprocessor; and c) a memory system for managing a memory address space, said memory system having a plurality of block address translation entries, each entry defining a portion of the memory address space, said memory system including:

i) means for determining that a received virtual address references a portion of the memory address space not defined by any of the block address translation entries;

ii) means for reallocating at least one of said block address translation entries to define a part of the memory address space that includes the portion of the memory space referenced by said received virtual address; and iii) means for providing a physical address matching the virtual address by using the reallocated block address translation entries.

12. The computer system of claim 11 wherein said means for determining includes determining that the received virtual address references a portion of the memory address space not defined by any translation lookaside buffer entries.

13. The computer system of claim 12 wherein said means for determining includes determining that the received virtual address references a portion of the memory address space not defined by any page table entries.

14. The computer system of claim 13 further comprising means for initially defining all the translation lookaside buffer entries and page table entries as invalid.

15. The computer system of claim 14 wherein said means for reallocating includes allocating access characteristics to said block address translation entries of said defined portion of the memory address space.

* * * * *